(12) United States Patent
Miyashita et al.

(10) Patent No.: US 9,919,697 B2
(45) Date of Patent: Mar. 20, 2018

(54) WORK VEHICLE

(71) Applicant: Kubota Corporation, Osaka (JP)

(72) Inventors: Shunsuke Miyashita, Sakai (JP); Yukifumi Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/356,737

(22) Filed: Nov. 21, 2016

(65) Prior Publication Data

US 2017/0274892 A1    Sep. 28, 2017

(30) Foreign Application Priority Data

Mar. 28, 2016 (JP) ................ 2016-064299

(51) Int. Cl.
*B60W 20/00* (2016.01)
*B60K 6/48* (2007.10)
*B60K 6/52* (2007.10)
*B60L 15/20* (2006.01)
*B60W 20/14* (2016.01)
*B60K 6/26* (2007.10)
*B60L 11/14* (2006.01)

(52) U.S. Cl.
CPC ............ *B60W 20/14* (2016.01); *B60K 6/26* (2013.01); *B60K 6/48* (2013.01); *B60K 6/52* (2013.01); *B60L 11/14* (2013.01); *B60L 15/20* (2013.01); *B60L 2240/423* (2013.01); *B60W 2520/28* (2013.01); *B60W 2710/081* (2013.01); *B60Y 2200/40* (2013.01); *B60Y 2300/60* (2013.01); *B60Y 2300/91* (2013.01); *B60Y 2400/112* (2013.01); *Y10S 903/916* (2013.01)

(58) Field of Classification Search
CPC ............ B60W 20/14; B60W 2520/28; B60W 2710/081; B60K 6/48; B60K 6/52; B60L 15/20; B60L 2240/423; Y10S 903/916; B60Y 2200/40
See application file for complete search history.

(56) References Cited

U.S. PATENT DOCUMENTS

| 6,549,832 | B2 * | 4/2003 | Nakasako | ................ B60K 6/48 180/65.25 |
| 6,617,704 | B2 * | 9/2003 | Tomikawa | ................ B60K 6/44 180/65.225 |
| 6,684,970 | B2 | 2/2004 | Gotou | |
| 7,028,796 | B2 * | 4/2006 | Kim | ........................ B60K 6/44 180/65.225 |
| 2003/0034188 | A1 | 2/2003 | Gotou | |
| 2012/0143426 | A1 * | 6/2012 | Yamamoto | ............. B60K 6/448 701/22 |

FOREIGN PATENT DOCUMENTS

JP           200361207 A    2/2003

* cited by examiner

Primary Examiner — Michael J Zanelli
(74) Attorney, Agent, or Firm — The Webb Law Firm

(57) ABSTRACT

A torque upper limit value changing section increases an upper limit value of a torque instruction value in a powering range in case a rotational speed reduction degree is greater than a reference value and decreases the upper limit value of the torque instruction value in the powering range in case the rotational speed reduction degree is smaller than the reference value.

3 Claims, 4 Drawing Sheets

WORK VEHICLE

CROSS-REFERENCE TO RELATED APPLICATION

This application claims priority to Japanese Patent Application No. 2016-064299 filed Mar. 28, 2016, the disclosure of which is hereby incorporated in its entirety by reference.

BACKGROUND OF THE INVENTION

Field of the Invention

The present invention relates to a work vehicle including a traveling device having a pair of left and right front wheels that can be driven and a pair of left and right rear wheels that can be driven, an engine that drives either one pair of the pair of left and right front wheels and the pair of left and right rear wheels, an electric motor that drives the other pair of the pair of left and right front wheels and the pair of left and right rear wheels, and a battery for supplying electric power to the electric motor.

Background Art

As an example of such work vehicle as described above, a work vehicle is known from Patent Document 1 (Japanese Unexamined Patent Application Publication No. 2003-61207). The work vehicle disclosed in Patent Document 1 includes a traveling device having a pair of left and right front wheels that can be driven and a pair of left and right rear wheels that can be driven, an engine that drives the pair of left and right rear wheels, an electric motor (referred to as "a motor generator" in the document) that drives the pair of left and right front wheels, and a battery for supplying electric power to the electric motor. With the work vehicle disclosed in Patent Document 1, traveling in a 4-wheel drive mode is possible in which drive power of the engine is transmitted to the pair of left and right rear wheels and drive power of the electric motor is transmitted to the pair of left and right front wheels.

SUMMARY

Problem to be Solved by Invention

In the case of the work vehicle disclosed in Patent Document 1, in an arrangement where a controller (referred to as an "integrated controller" in the document) controls the electric motor based on relation between a rotational speed of the electric motor and a torque instruction value, by setting high an upper limit value of the torque instruction value in a powering range, in the 4 WD mode, the electric motor can provide a large output, thus ensuring traveling performance on a bad road. In this case, however, even during traveling on a good road not requiring such high output from the electric motor, the output of the electric motor becomes larger than necessary, so electric power consumption amount of the electric motor increases disadvantageously.

In view of the above-described state of the art, there is a need for a work vehicle that can ensure traveling performance on a bad road and that also can reduce electric power consumption amount of the electric motor.

Solution

According to the present invention, a work vehicle comprises:

a traveling device having a pair of left and right front wheels that can be driven and a pair of left and right rear wheels that can be driven;

an engine that drives either one pair of the pair of left and right front wheels and the pair of left and right rear wheels;

an electric motor that drives the other pair of the pair of left and right front wheels and the pair of left and right rear wheels;

a battery for supplying electric power to the electric motor;

a controller configured to control the electric motor based on relation between a rotational speed of the electric motor and a torque instruction value;

a front-wheel rotational speed detection sensor for detecting a rotational speed of the front wheels; and a rear-wheel rotational speed detection sensor for detecting a rotational speed of the rear wheels;

wherein the controller includes:

a rotational speed reduction degree calculating section for calculating, based on a detection value from the front-wheel rotational speed detection sensor and a detection value from the rear-wheel rotational speed detection sensor, a rotational speed reduction degree which is a degree of reduction of the rotational speed of either the front wheels or the rear wheels that are driven by the electric motor relative to a rotational speed of either the front wheels or the rear wheels that are driven by the engine;

a torque upper limit value changing section for changing an upper limit value of the torque instruction value, based on result of comparison between the rotational speed reduction degree and a reference value; and wherein the torque upper limit value changing section is configured to increase the upper limit value of the torque instruction value in the powering range in case the rotational speed reduction degree is greater than the reference value and to decrease the upper limit value of the torque instruction value in the powering range in case the rotational speed reduction degree is smaller than the reference value.

In a road (good road) having a good road surface condition such as a paved road, due to the good road surface condition, power can be transmitted effectively and efficiently between the front wheels and the rear wheels via the road surface. Therefore, when traveling on a good road, rotation of the front wheels and rotation of the rear wheels can be synchronized with each other easily, so a rotational speed reduction degree tends to be small. In contrast, in the case of a road (bad road) having a bad or poor road surface condition such as an unpaved road, due to the bad road surface condition, power cannot be transmitted effectively or efficiently between the front wheels and the rear wheels via the road surface. Therefore, when traveling on a bad road, rotation of the front wheels and rotation of the rear wheels cannot be synchronized with each other easily, so a rotational speed reduction degree tends to be large.

With the above-described characterizing feature, in case the rotational speed reduction degree is greater than the reference value, namely, in the case of traveling on a bad road, the upper limit value of the torque instruction value in the powering range is increased. With this, during bad road traveling requiring high output from the electric motor, the output of the electric motor is increased, so that traveling performance on the bad road can be ensured. Also, in case the rotational speed reduction degree is smaller than the reference value, namely, in the case of traveling on a good road, the upper limit value of the torque instruction value in the powering range is decreased. With this, during good road traveling not requiring high output from the electric motor, the output of the electric motor is decreased, so that electric power consumption of the electric motor can be reduced.

Further, in the present invention, preferably:
the torque upper limit value changing section is configured to decrease the upper limit value of the torque instruction value in a regeneration range in case the rotational speed reduction degree is greater than the reference value and to increase the upper limit value of the torque instruction value in the regeneration range in case the rotational speed reduction degree is smaller than the reference value.

With the above-described characterizing feature, in case the rotational speed reduction degree is greater than the reference value, namely, in the case of traveling on a bad road, the upper limit value of the torque instruction value in the regeneration range is decreased. With this, during bad road traveling requiring high output from the electric motor, the regeneration power of the electric motor is decreased, so that traveling performance on the bad road can be ensured. Also, in case the rotational speed reduction degree is smaller than the reference value, namely, in the case of traveling on a good road, the upper limit value of the torque instruction value in the regeneration range is increased. With this, during good road traveling not requiring high output from the electric motor, the regeneration power of the electric motor is increased, so that electric power charging amount of the battery can be increased.

Further, in the present invention, preferably:
the rotational speed reduction degree calculating section is configured to calculate the rotational speed reduction degree by subtracting the rotational speed of either the front wheels or the rear wheels that are driven by the electric motor from the rotational speed of either the front wheels or the rear wheels that are driven by the engine.

With the above-described characterizing feature, the rotational speed reduction degree can be calculated by a simple arrangement of merely subtracting the rotational speed of either the front wheels or the rear wheels that are driven by the electric motor from the rotational speed of either the front wheels or the rear wheels that are driven by the engine.

EMBODIMENT

Next, an embodiment of the present invention will be explained with reference to the accompanying drawings. Incidentally, in the following discussion, a direction of arrow F shown in FIG. 1 and FIG. 2 shall represent "a vehicle body front side", a direction of arrow B shown in the same shall represent "a vehicle body rear side", respectively. And, a direction of arrow L shown in FIG. 2 shall represent "a vehicle body left side" and a direction of arrow R shown in the same shall represent "a vehicle body right side", respectively.

[General Configuration of Utility Vehicle]

Figure 1:
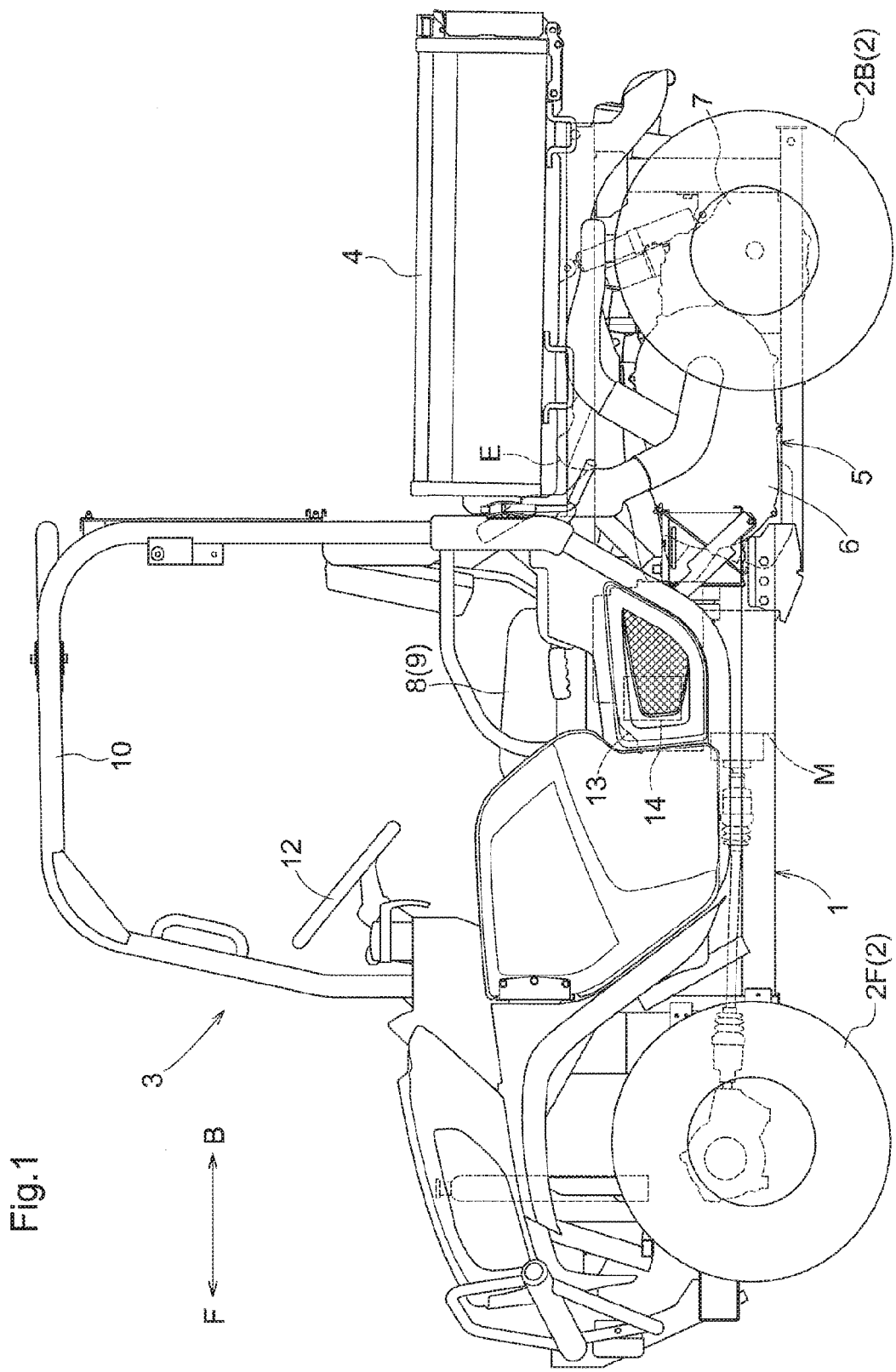
FIG. 1 is a left side view showing a utility vehicle.
Figure 2:
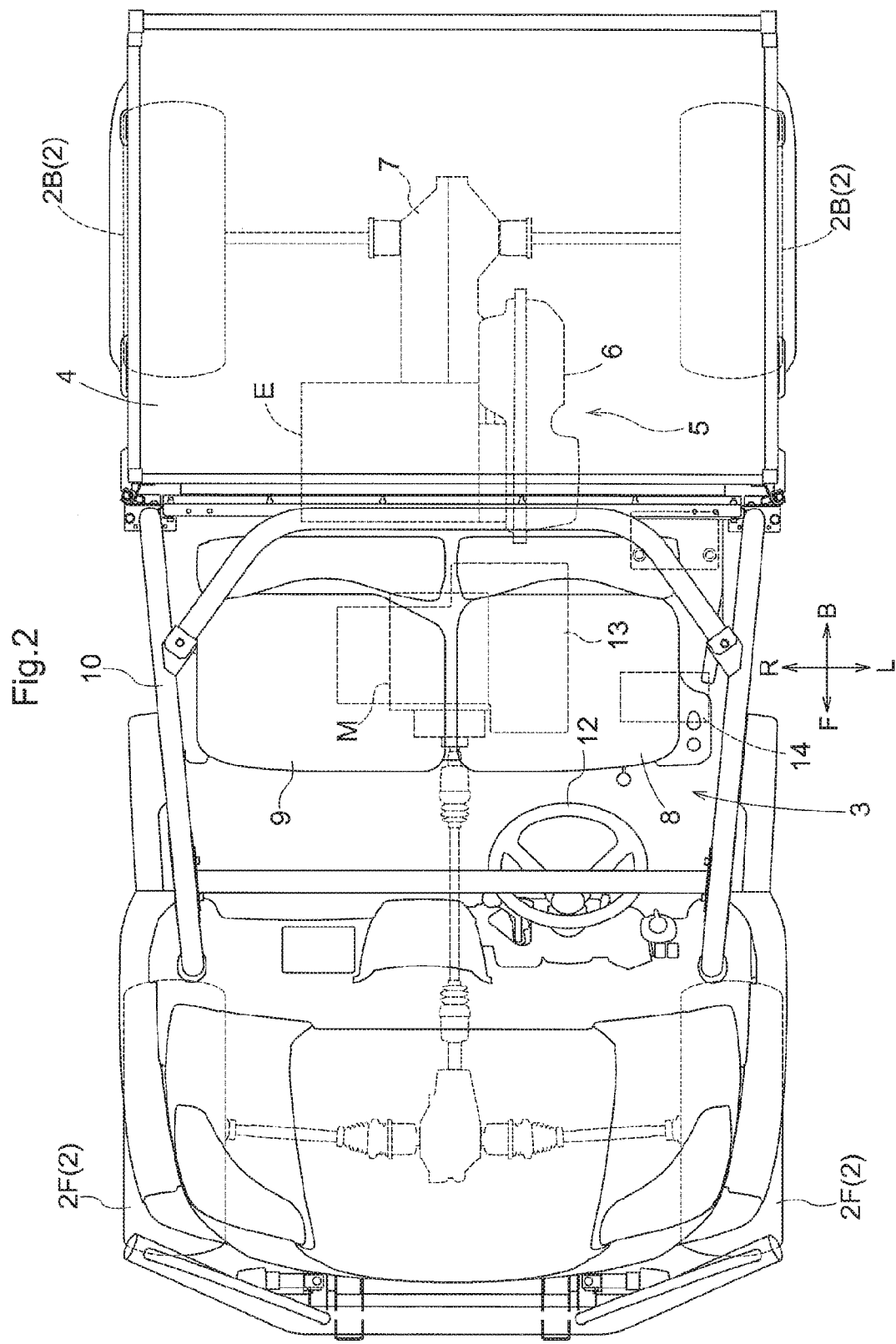
FIG. 2 is a plane view showing the utility vehicle.

FIG. 1 and FIG. 2 show a utility vehicle (a multi-purpose vehicle" corresponding to what is referred to as "a work vehicle" relating to the present invention). This utility vehicle is a hybrid work vehicle including an engine E and an electric motor M as driving sources. This utility vehicle includes a vehicle body frame 1 and a wheel type traveling device 2 that supports the vehicle body frame 1. The traveling device 2 includes a pair of left and right front wheels 2F that can be steered and also driven, and a pair of left and right rear wheels 2R that can be driven. This utility vehicle can be selectively switched into a 4WD mode in which the drive power of the engine E is transmitted to the pair of left and right rear wheels 2B and also the drive power of the electric motor M is transmitted to the pair of left and right front wheels 2F, or a 2WD mode in which the drive power of the engine E is transmitted to the pair of left and right rear wheels 2B, but no drive power of the electric motor M is transmitted to the pair of left and right front wheels 2F, or an EV mode in which the drive power of the electric motor M is transmitted to the pair of left and right front wheels 2F, but no drive power of the engine E is transmitted to the pair of left and right rear wheels 2B.

At a front-rear center portion of the vehicle body frame 1, there is provided a driving section 3 where a passenger is to ride. At a rear portion of the vehicle body frame 1, a loading platform 4 is provided. This loading platform 4 is vertically pivotable about a rear pivot, thus being capable of dumping a load thereon to the rear side. Downwardly of the loading platform 4, an engine section 5 is provided. This engine section 5 includes the engine E, a belt stepless speed changer device 6 for steplessly changing a speed of the drive power of the engine E, and a transmission 7 for transmitting the speed-changed power from the belt stepless speed changer device 6 to the traveling device 2 (pair of left and right rear wheels 2B). The transmission 7 includes a gear speed changer mechanism (not shown), a differential mechanism (not shown), etc.

[Driving Section]

The driving section 3 includes a driver's seat 8 to be seated by a driver, a passenger's seat 9 to be seated by a passenger, a driver/passenger protecting ROPS 10, and a steering wheel 12. In addition to the above, the driving section 3 includes also an accelerator pedal 15 for setting a traveling speed and a traveling mode switching switch 16 for switching over the traveling mode (see FIG. 3). Downwardly of the driving section 3, there are mounted the electric motor M for driving the pair of left and right front wheels 2F, a battery 13 for supplying electric power to the electric motor M and an inverter 14 for converting electric power between the electric motor M and the battery 13.

[Controller]

Figure 3:
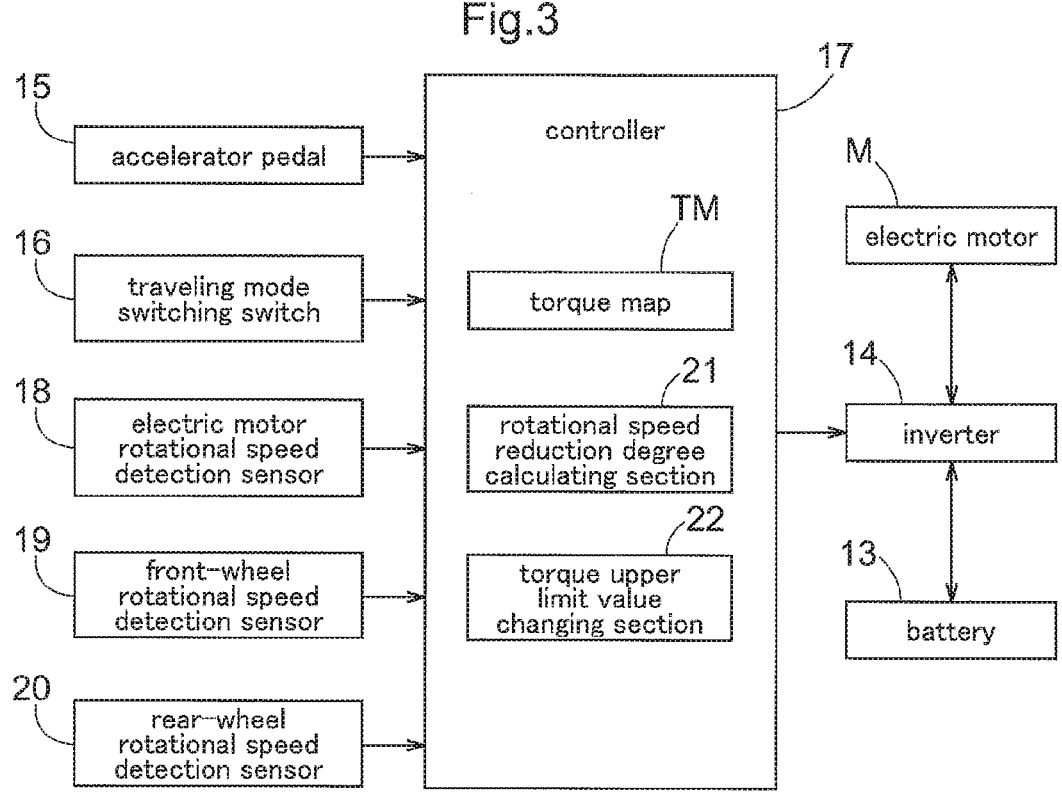
FIG. 3 is a view showing a control block of a controller.

As shown in FIG. 3, this utility vehicle includes a controller 17 for controlling the electric motor M. The controller 17 is configured to input an operational signal of the accelerator pedal 15, a switching signal of the traveling mode switching switch 16. Further, the controller 17 inputs a detection signal from an electric motor rotational speed detection sensor 18 for detecting a rotational speed N of the electric motor M, a detection signal from a front-wheel rotational speed detection sensor 19 for detecting a rotational speed of the front wheels 2F, and a detection signal from a rear-wheel rotational speed detection sensor 20 for detecting a rotational speed of the rear wheels 2B. The controller 17 includes a torque map TM, a rotational speed reduction degree calculating section 21, a rotational speed reduction degree comparing section 22, and a torque upper limit value changing section 23.

Figure 4:
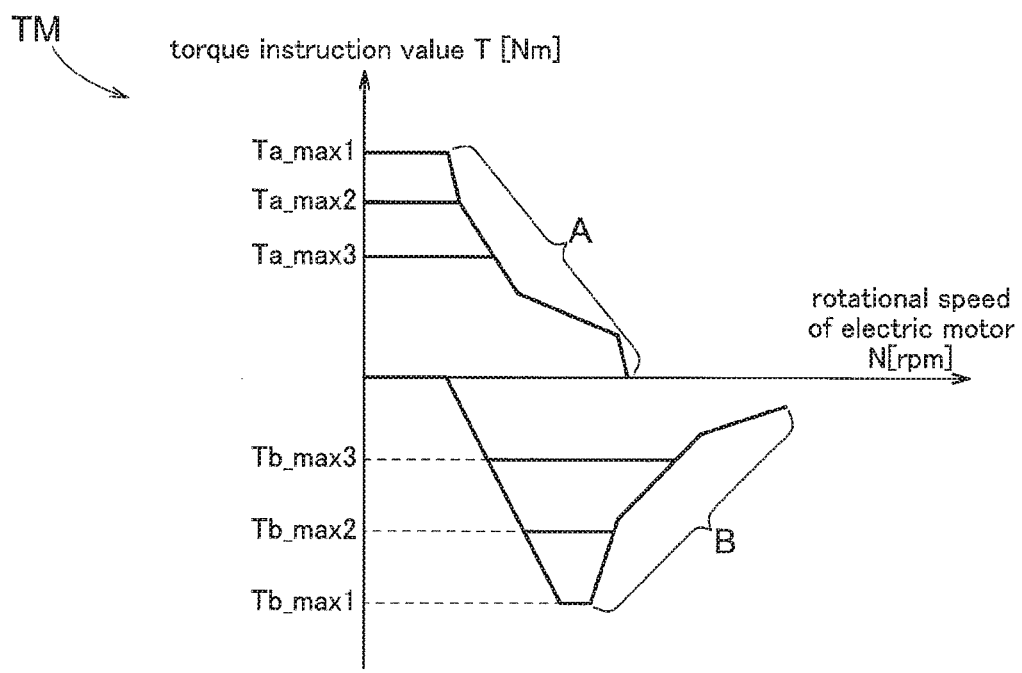
FIG. 4 is a view showing relation between a rotational speed of an electric motor and a torque instruction value.

As shown in FIG. 4, the torque map TM defines relation between the rotational speed N of the electric motor M and a torque instruction value T. In this torque map TM, the horizontal axis represents the rotational speed N of the electric motor M and the vertical axis represents the torque instruction value T. The region upward relative to the horizontal axis in the torque map TM defines the relation between the rotational speed N of the electric motor M and the torque instruction value T in a forward traveling side powering range, whereas the region downward relative to the horizontal axis in the torque map TM defines the relation between the rotational speed N of the electric motor M and the torque instruction value T in a forward traveling side regeneration range. In FIG. 4, a current limiting portion A on the powering side and a current limiting portion B on the regeneration side represent portions where an upper limit value of the torque instruction value T is determined by limiting of current.

The rotational speed reduction degree calculating section 21 calculates a rotational speed reduction degree $\Delta V$ indicative of a degree of reduction in a rotational speed of the front wheels 2F relative to a rotational speed of the rear wheels 2B, based on a detection value of the front-wheel rotational speed detection sensor 19 and a detection value of the rear-wheel rotational speed detection sensor 20. In this embodiment, the rotational speed reduction degree calculating section 21 is configured to calculate such rotational speed reduction degree $\Delta V$ by subtracting a rotational speed of the front wheels 2F from a rotational speed of the rear wheels 2B (a rotational speed of the rear wheels 2B—a rotational speed of the front wheels 2F). And, the rotational speed reduction degree calculating section 21 sets the rotational speed reduction degree $\Delta V$ as zero, if the rotational speed reduction degree $\Delta V$ has a negative value (i.e. if the rotational speed of the front wheels 2F is faster than the rotational speed of the rear wheels 2B). The torque upper limit value changing section 23 is configured to change the upper limit value of the torque instruction value T, based on result of comparison between the rotational speed reduction degree $\Delta V$ and a reference rotational speed reduction degree $\Delta Vs$.

Incidentally, in the following discussion, the upper limit value of the torque instruction value T in the powering range will be referred to as "powering side torque upper limit value Ta_max", whereas the upper limit value of the torque instruction value T in the regeneration range will be referred to as "regeneration side torque upper limit value Tb_max". Further, regarding the upper limit values of the torque instruction value T, the term "torque limiting value" means an upper limit value of the torque instruction value T defined by torque limitation, and the term "current limiting value" means an upper limit value of the torque instruction value T defined by electric current limitation.

[Powering/Regeneration Control of Electric Motor]

Figure 5:
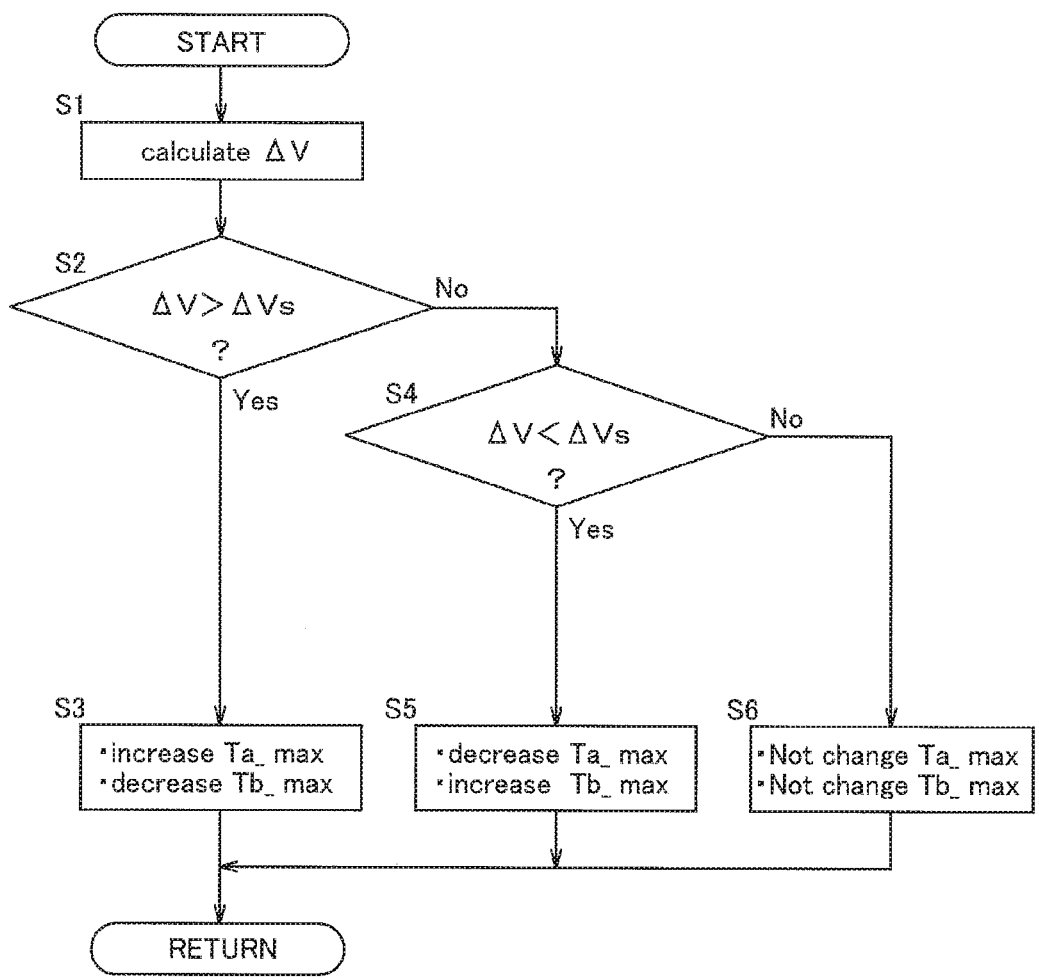
FIG. 5 is a view showing a control flow of the controller.

Next, powering/regeneration control of the electric motor M will be explained with reference to FIG. 5. As shown in FIG. 5, the rotational speed reduction degree calculating section 21 calculates a rotational speed reduction degree $\Delta V$ (S1).

If the rotational speed reduction degree $\Delta V$ is greater than the reference rotational speed reduction degree $\Delta Vs$ (S2: Yes), the torque upper limit value changing section 23 increases the powering side torque upper limit value Ta_max and also decreases the regeneration side torque upper limit value Tb_max (S3). Namely, in correspondence with the rotational speed reduction degree $\Delta V$, the powering side torque upper limit value (torque limitation value, current limitation value) is increased and also the regeneration side torque upper limit value (torque limitation value, current limitation value) is increased.

For instance, in FIG. 4, if the powering side torque limit value (torque limitation value) is Ta_max2 and the regeneration side torque limit value (torque limitation value) is Tb_max2, the powering side torque limit value (torque limitation value) is increased from Ta_max2 to Ta_max1 and also the regeneration side torque upper limit value (torque limitation value) is decreased from Tb_max2 to Tb_max3. Also, in FIG. 4, in the powering side current limiting portion A, the powering side torque upper limit value (current limitation value) is increased and also in the regeneration side current limiting portion B, the regeneration side torque upper limit value (current limitation value) is decreased.

If the rotational speed reduction degree $\Delta V$ is smaller than the reference rotational speed reduction degree $\Delta Vs$ (S2: No, S4: Yes), the torque upper limit value changing section 23 decreases the powering side torque upper limit value Ta_max and also increases the regeneration side torque upper limit value Tb_max (S5). Namely, in correspondence with the rotational speed reduction degree $\Delta V$, the powering side torque upper limit value (torque limitation value, current limitation value) is decreased and also the regeneration side torque upper limit value (torque limitation value, current limitation value) is increased.

For instance, in FIG. 4, if the powering side torque limit value (torque limitation value) is Ta_max2 and the regeneration side torque limit value (torque limitation value) is Tb_max2, the powering side torque limit value (torque limitation value) is decreased from Ta_max2 to Ta_max3 and also the regeneration side torque upper limit value (torque limitation value, current limitation value) is increased from Tb_max2 to Tb_max1. Also, in FIG. 4, in the powering side current limiting portion A, the powering side torque upper limit value (current limitation value) is decreased and also in the regeneration side current limiting portion B, the regeneration side torque upper limit value (current limitation value) is increased.

If the rotational speed reduction degree $\Delta V$ is equal to the reference rotational speed reduction degree $\Delta Vs$ (S2: No, S4: No), the torque upper limit value changing section 23 changes neither the powering side torque upper limit value Ta_max nor the regeneration side torque upper limit value Tb_max (S6).

For instance, in FIG. 4, if the powering side torque limit value (torque limitation value) is Ta_max2 and the regeneration side torque limit value (torque limitation value) is Tb_max2, the powering side torque limit value (torque limitation value) is maintained at Ta_max2 and also the regeneration side torque upper limit value (torque limitation value) is maintained at Tb_max2. Further, in FIG. 4, in the powering side current limiting portion A, the powering side torque upper limit value (current limitation value) is maintained and also in the regeneration side current limiting portion B, the regeneration side torque upper limit value (current limitation value) is maintained.

With the above-described configuration, in case the rotational speed reduction degree $\Delta V$ is greater than the reference rotational speed reduction degree $\Delta Vs$, namely, in the case of traveling on a bad road, the upper limit value of the torque instruction value T in the powering range is increased. With this, during bad road traveling requiring high output from the electric motor M, the output of the electric motor M is increased, so that traveling performance on the bad road can be ensured. Also, in case the rotational speed reduction degree $\Delta V$ is smaller than the reference value $\Delta Vs$, namely, in the case of traveling on a good road, the upper limit value of the torque instruction value T in the powering range is decreased. With this, during good road traveling not requiring high output from the electric motor M, the output of the electric motor M is decreased, so that the electric power consumption amount of the electric motor M can be reduced.

Further, in case the rotational speed reduction degree ΔV is greater than the reference rotational speed reduction degree ΔVs, namely, in the case of traveling on a bad road, the upper limit value of the torque instruction value T in the regeneration range is decreased. With this, during bad road traveling requiring high output from the electric motor M, the regeneration power of the electric motor M is decreased, so that traveling performance on the bad road can be ensured. Also, in case the rotational speed reduction degree ΔV is smaller than the reference value ΔVs, namely, in the case of traveling on a good road, the upper limit value of the torque instruction value T in the regeneration range is increased. With this, during good road traveling not requiring high output from the electric motor M, the regeneration power of the electric motor M is increased, so that the electric power charging amount of the battery 13 can be increased.

Other Embodiments (1) In the foregoing embodiment, the torque upper limit changing section 23 changes the powering side torque upper limit value Ta_max and also the regeneration side torque upper limit value Tb_max, based on result of comparison between the rotational speed reduction degree ΔV and the reference rotational speed reduction degree ΔVs. However, the torque upper limit changing section 23 can change only powering side torque upper limit value Ta_max.

(2) In the foregoing embodiment, the torque upper limit changing section 23 changes the powering side torque upper limit value Ta_max and also the regeneration side torque upper limit value Tb_max, based on result of comparison between the rotational speed reduction degree ΔV and the reference rotational speed reduction degree ΔVs. However, the invention is not limited thereto.

For instance, the torque upper limit changing section 23 can be configured such that upper limit values of the torque instruction value T are calculated successively, with increasing the upper limit value of the powering side instructing value T in association with increase of the rotational speed reduction degree ΔV (decrease of the upper limit value of the regeneration side torque instruction value T) and with also decreasing the upper limit value of the powering side instructing value T in association with decrease of the rotational speed reduction degree ΔV (increase of the upper limit value of the regeneration side torque instruction value T). Further alternatively, a plurality of reference rotational speed reduction degrees ΔVs can be set so as to allow the upper limit value of the torque instruction value T to change stepwise.

(3) In the foregoing embodiment, the rotational speed reduction degree calculating section 21 is configured to calculate the rotational speed reduction degree ΔV by subtracting a rotational speed of the front wheels 2F from a rotational speed of the rear wheels 2B. However, the method of calculating the rotational speed reduction degree ΔV is not limited to the method relating to the foregoing embodiment. For instance, the rotational speed reduction degree ΔV can be a ratio between a rotational speed of the front wheels 2F and a rotational speed of the rear wheels 2B (a rotational speed of the front wheels 2F/a rotational speed of the rear wheels 2B).

(4) The relation defined in the torque map TM between the rotational speed N of the electric motor M and the torque instruction value T is only illustrative. The relation between the rotational speed N of the electric motor M and the torque instruction value T is not limited to the one defined by the torque map TM.

(5) In the foregoing embodiment, the pair of left and right front wheels 2F are driven by the electric motor M and the pair of left and right rear wheels 2B are driven by the engine E. Instead, the pair of left and right front wheels 2F can be driven by the engine E and the pair of left and right rear wheels 2B are driven by the electric motor M.

(6) The present invention is applicable not only to a utility vehicle, but also to a tractor, a rice planting machine or a combine, and applicable not only to an agricultural work vehicle, but also to a civil engineering work vehicle.

The invention claimed is:

1. A work vehicle comprising:
   a traveling device having a pair of left and right front wheels that can be driven and a pair of left and right rear wheels that can be driven;
   an engine that drives either one pair of the pair of left and right front wheels and the pair of left and right rear wheels;
   an electric motor that drives the other pair of the pair of left and right front wheels and the pair of left and right rear wheels;
   a battery for supplying electric power to the electric motor;
   a controller configured to control the electric motor based on relation between a rotational speed of the electric motor and a torque instruction value;
   a front-wheel rotational speed detection sensor for detecting a rotational speed of the front wheels; and
   a rear-wheel rotational speed detection sensor for detecting a rotational speed of the rear wheels;
   wherein the controller includes:
      a rotational speed reduction degree calculating section for calculating, based on a detection value from the front-wheel rotational speed detection sensor and a detection value from the rear-wheel rotational speed detection sensor, a rotational speed reduction degree which is a degree of reduction of the rotational speed of either the front wheels or the rear wheels that are driven by the electric motor relative to a rotational speed of either the front wheels or the rear wheels that are driven by the engine;
      a torque upper limit value changing section for changing an upper limit value of the torque instruction value, based on result of comparison between the rotational speed reduction degree and a reference value; and
   wherein the torque upper limit value changing section is configured to increase the upper limit value of the torque instruction value in a powering range in case the rotational speed reduction degree is greater than the reference value and to decrease the upper limit value of the torque instruction value in the powering range in case the rotational speed reduction degree is smaller than the reference value.

2. The work vehicle according to claim 1, wherein the torque upper limit value changing section is configured to decrease the upper limit value of the torque instruction value in a regeneration range in case the rotational speed reduction degree is greater than the reference value and to increase the upper limit value of the torque instruction value in the regeneration range in case the rotational speed reduction degree is smaller than the reference value.

3. The work vehicle according to claim 1, wherein the rotational speed reduction degree calculating section is configured to calculate the rotational speed reduction degree by subtracting the rotational speed of either the front wheels or the rear wheels that are driven by the electric motor from the rotational speed of either the front wheels or the rear wheels that are driven by the engine.

\* \* \* \* \*